US012780586B2

(12) United States Patent
Freidberg et al.

(10) Patent No.: US 12,780,586 B2
(45) Date of Patent: *Nov. 3, 2026

(54) DUAL ROLLER APPLICATOR FOR SEAM TAPE

(71) Applicant: LOUISIANA-PACIFIC CORPORATION, Nashville, TN (US)

(72) Inventors: Neil Freidberg, Lebanon, TN (US); Frank Rozenbaum, Lebanon, TN (US); Richard McClintock, Cullman, AL (US); Rylie Barling, Kansas City, MO (US)

(73) Assignee: LOUISIANA-PACIFIC CORP., Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,830

(22) Filed: Nov. 20, 2023

(65) Prior Publication Data

US 2024/0083707 A1 Mar. 14, 2024

Related U.S. Application Data

(63) Continuation-in-part of application No. 18/137,929, filed on Apr. 21, 2023.

(60) Provisional application No. 63/546,579, filed on Oct. 31, 2023, provisional application No. 63/333,375, filed on Apr. 21, 2022.

(51) Int. Cl.

| | |
|---|---|
| ***B29C 65/00*** | (2006.01) |
| ***B65H 35/00*** | (2006.01) |
| *B29C 65/50* | (2006.01) |
| *B29C 65/74* | (2006.01) |
| *B65H 35/06* | (2006.01) |

(52) U.S. Cl.

CPC .......... *B65H 35/0033* (2013.01); *B29C 65/50* (2013.01); *B29C 65/7435* (2013.01); *B65H 35/06* (2013.01); *B65H 2402/412* (2013.01); *B65H 2404/15* (2013.01); *B65H 2701/377* (2013.01)

(58) Field of Classification Search

CPC ...... B29C 65/50; B29C 65/7435; B65H 35/06

See application file for complete search history.

(56) References Cited

U.S. PATENT DOCUMENTS 4,838,986 A * 6/1989 Rhoades ................. B60R 13/04 156/574
5,393,289 A * 2/1995 Green ................. B29C 66/8362 492/19
2014/0311677 A1* 10/2014 Huang .................... B29C 65/00 156/510

* cited by examiner

*Primary Examiner* — Philip C Tucker
*Assistant Examiner* — Nickolas R Harm
(74) *Attorney, Agent, or Firm* — Wayne Edward Ramage; Baker Donelson

(57) ABSTRACT

A one-handed tool for use in application of seam tape or seaming tape. The device has a frame with an upper support with an ergonomic grip, with a finger guard or shield extending across the front of the grip to protect the user's fingers. A primary roller support and a secondary roller support extend downward from upper support. Each roller support comprises a pair of parallel arms extending downward at angles behind and in front of the upper support when in use, supporting a primary roller and a secondary roller, respectively. The primary roller is used to apply pressure to the seaming tape, while the secondary roller is used for stability and to apply additional pressure to the edges of the seaming tape. A retractable blade or knife may be located on one or more roller supports.

20 Claims, 14 Drawing Sheets

DUAL ROLLER APPLICATOR FOR SEAM TAPE

This application is a continuation-in-part application of U.S. patent application Ser. No. 18/137,929, filed Apr. 21, 2023, which claims benefit of and priority to U.S. Provisional App. No. 63/333,375, filed Apr. 21, 2022; this application also claims benefit of and priority to U.S. Provisional Application No. 63/546,579, filed Oct. 31, 2023. All of the above-referenced applications are incorporated herein in their entireties by specific reference for all purposes.

FIELD OF INVENTION

This invention relates to a tool or apparatus with dual rollers for single-handed application of a seam or seaming tape. More particularly, the invention relates to a single-handed seaming tape roller with two rollers configured to provide stability and prevent hand twisting.

BACKGROUND OF INVENTION

Seaming tape (also referred to as seam tape) is commonly used to cover, seal or bridge a seam (or joint) between two panels or boards or similar construction material, which are typically used in residential and commercial construction. The tape contacts and adheres to the surface of the panels or boards to either side of the seam, which is generally covered by the middle section of the tape. Seaming tape typically comes in rolls of various widths and total lengths, such as, but not limited to, a 3% inch width and a 6 inch width.

If the seaming tape is not properly installed, then air, water, and/or water vapor may pass through the seam. An example of a compression roller device for use during application of seaming tape is disclosed in Oates, et al., US 2019/0105850 A1 (published Apr. 11, 2019), which is incorporated herein by specific reference for all purpose. The device in Oates, however, marks the tape and has a long handle designed for two-handed use. Such handles often interfere with or prevent precise application of proper pressure to the seaming tape.

SUMMARY OF INVENTION

In various exemplary embodiments, the present invention comprises a one-handed tool for use in application of seam tape or seaming tape. The device comprises a frame with an upper support with an ergonomic grip attached thereto or integrated therewith. A finger guard or shield extends across the front of the grip to protect the user's fingers. A primary roller support and a secondary roller support extend downward from upper support. Each roller support comprises a pair of parallel arms extending downward at angles behind and in front of the upper support when in use.

A primary roller is located on the primary roller support, generally under and behind the grip. The primary roller comprises a cylinder extending laterally across the width of the tool, and is rotationally mounted on the respective ends of the primary roller support. Mounting can be by mounting posts or the respective ends of a tube, core, or axle that extend from the ends of the cylinder, and that snap-fit into or are otherwise held in respective openings at or proximate to the ends of respective arms of the primary roller support. The primary roller may be removably mounted, and thus a primary roller can be replaced with a roller of the same configuration, material and/or size, or a differing configuration, material and/or size.

The diameter of the ends is the same, and in several embodiments, the outer diameter of the cylinder is the same throughout its length. In other embodiments, the outer diameter of the cylinder of the primary roller may vary for some portion along its length, such that the diameter at either end of the cylinder is greater than the diameter in the middle or center of the cylinder. As shown in the figures, the middle diameter is slightly less than the diameter at the ends (the diameter at each end is the same). This configuration allows the edges of the tape being rolled to receive more pressure, while the smaller diameter center helps to reduce tape puncture over the underlying seam.

The cylinder of the primary roller may be made of rubber (hard or soft), pure gum natural rubber, latex rubber, hard synthetic rubber, plastic, foam (soft or firm), or similar material. The core or axle may be metal or plastic, which prevents bending or warping of the primary roller. Preferably, the face of the cylinder is smooth, so as to reduce deformation or puncture of the tape. In a preferred embodiment, no indentations, indicia, or other markings are made on the tape.

The secondary roller comprises a cylinder with two sections with the same outer diameter proximate the ends of the cylinder, with the center portion or section having a smaller outer diameter. This configuration allows the secondary roller to act as a stable support for the user without touching the tape sections over the underlying seam, thereby reducing tape puncture and tears in that area. In the embodiment shown, the end sections have a diameter equal to the diameter of the ends (or the entirety) of the primary tape roller, thereby providing a stable support for the user, which can help prevent injuries from falls or the like, such as when the user is working in an elevated position (e.g., from a ladder), by allowing the user to maintain "three or multiple points of contact" while rolling the tape.

DETAILED DESCRIPTION OF EXEMPLARY EMBODIMENTS

Figure 1:
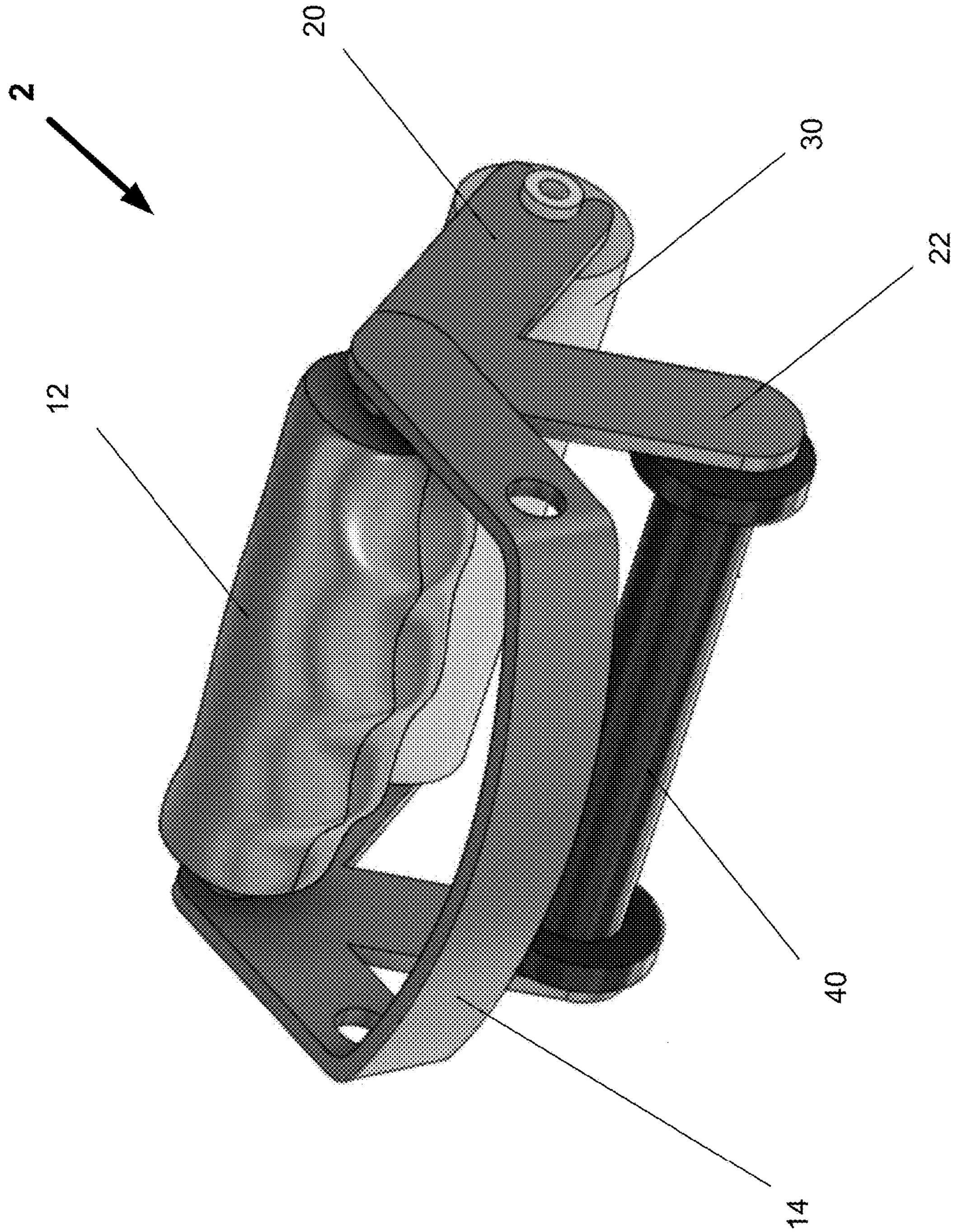
FIG. 1 shows a front perspective view of a tool in accordance with an exemplary embodiment of the present invention.
Figure 2:
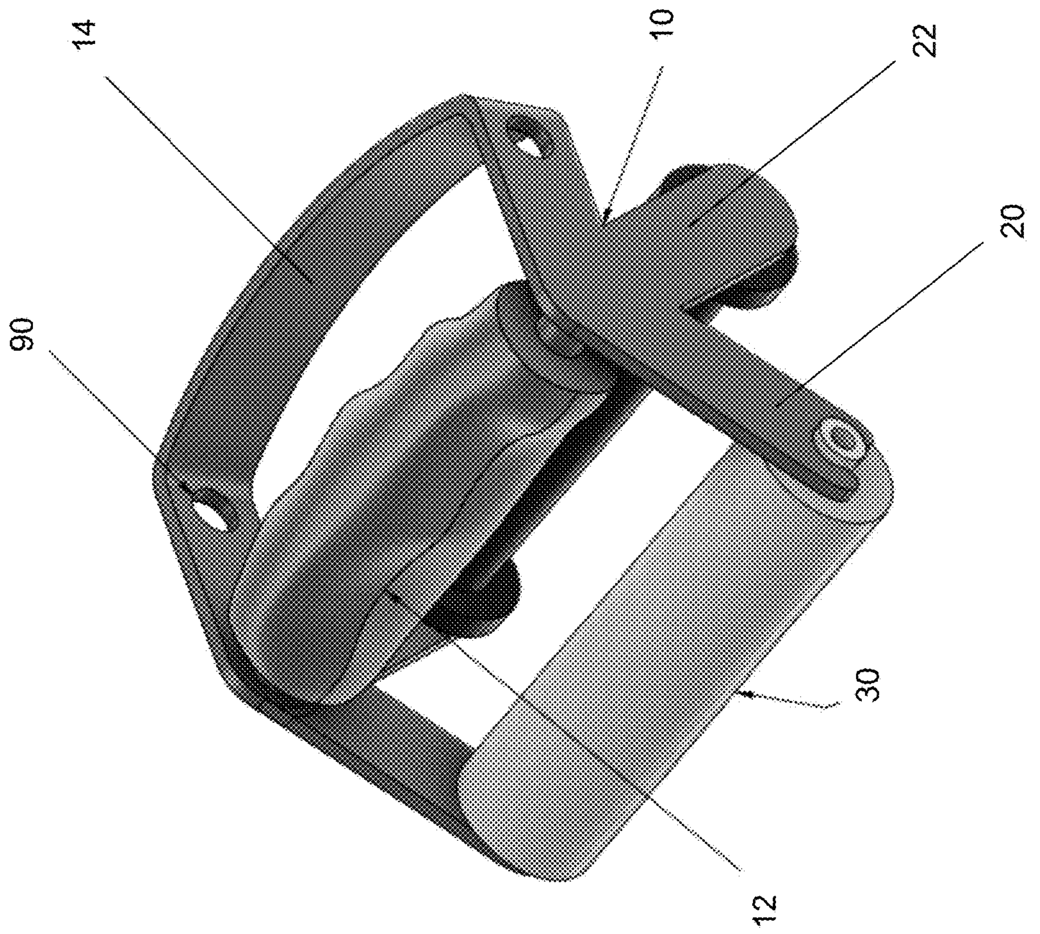
FIG. 2 shows a rear perspective view of the tool of FIG. 1.
Figure 3:
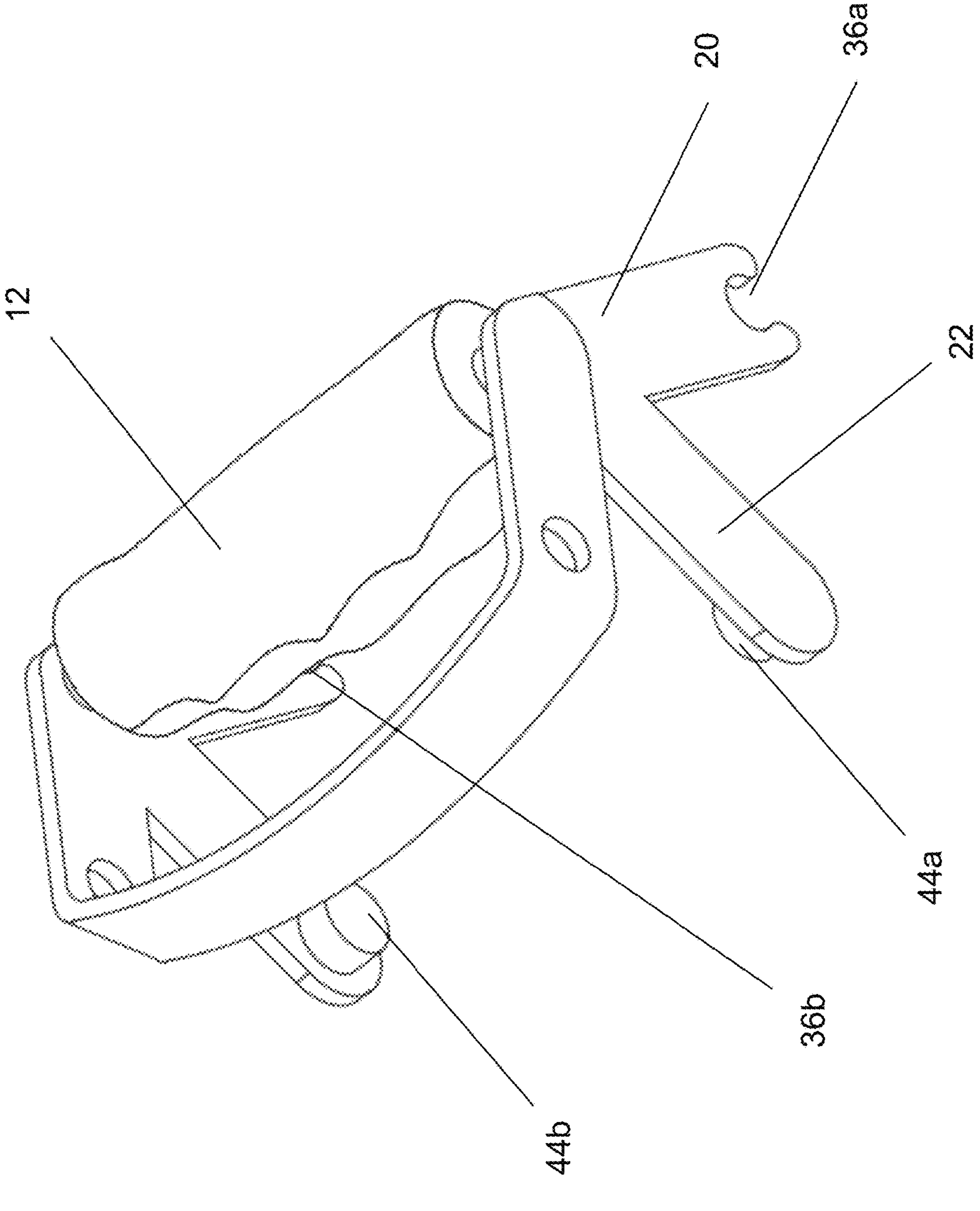
FIG. 3 shows a front perspective view of the frame with the primary roller and secondary roller removed.
Figure 4:
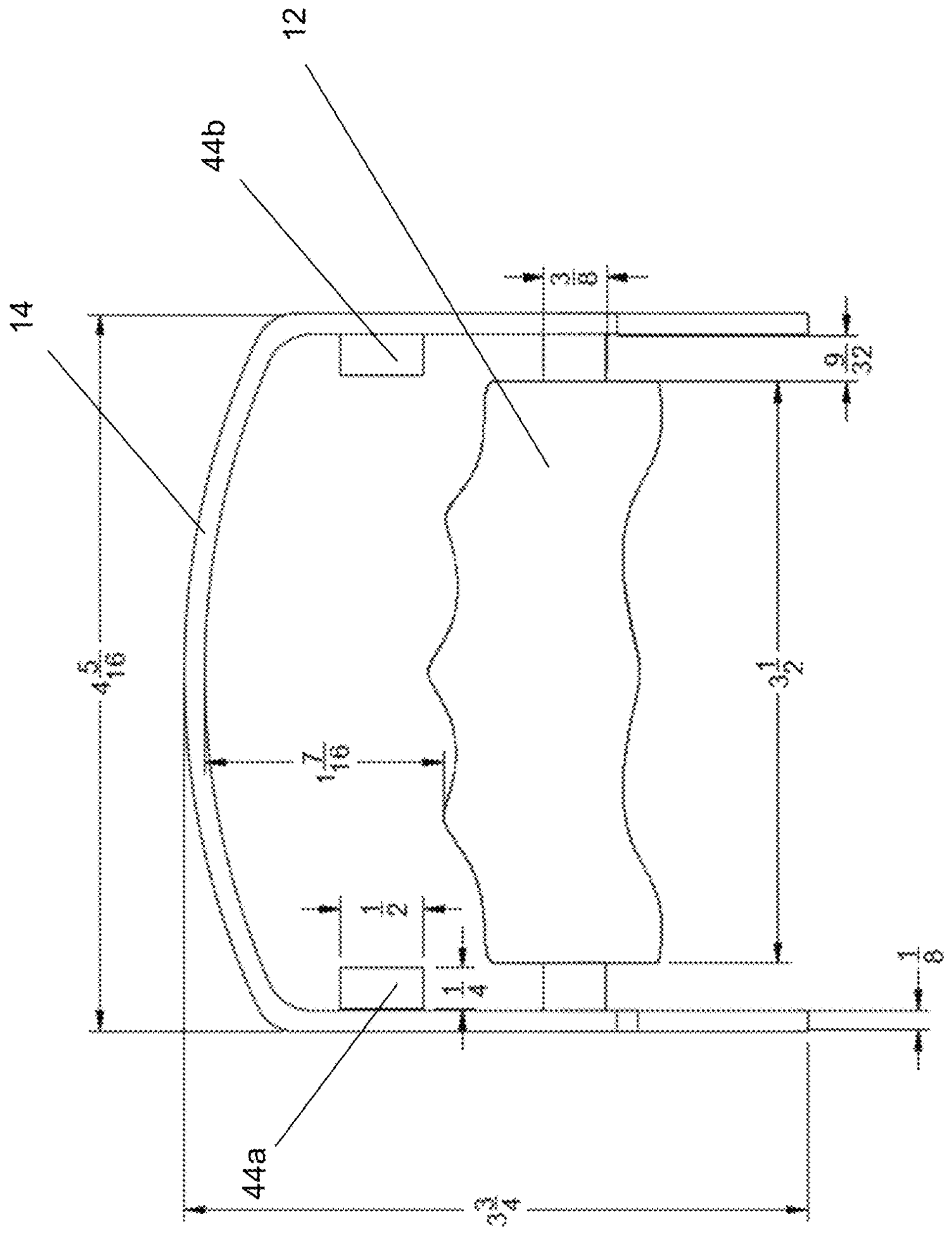
FIG. 4 shows a top view of FIG. 3.

In various exemplary embodiments, as seen in FIGS. 1 and 2, the present invention comprises a one-handed tool 2 for use in application of seam tape or seaming tape. The device comprises a frame 8 with an upper support 10 with an ergonomic grip 12 attached thereto or integrated therewith. A finger guard or shield 14 extends across the front of the grip to protect the user's fingers. A primary roller support 20 and a secondary roller support 22 extend downward from upper support. As seen in FIGS. 1-3, each roller support comprises a pair of parallel arms extending downward at angles behind and in front of the upper support when in use.

A primary roller 30 is located on the primary roller support 20, generally under and behind the grip 12. The primary roller 30 comprises a cylinder 32 extending laterally across the width of the tool, and is rotationally mounted on the respective ends of the primary roller support 20. Mounting can be by mounting posts or the respective ends 34*a, b* of a tube, core, or axle that extend from the ends of the cylinder, and that snap-fit into or are otherwise held in respective openings 36*a, b* at or proximate to the ends of respective arms of the primary roller support 30. The primary roller 30 may be removably mounted, and thus a primary roller can be replaced with a roller of the same configuration, material and/or size, or a differing configuration, material and/or size.

The diameter of the ends is the same, and in the configuration shown in FIGS. 1-2 and 6-7B, the outer diameter of the cylinder is the same throughout its length. In the embodiment shown in FIGS. 7A and 7B, the outer diameter of the cylinder is 1⅛ inch, and the tube or axle ends 34*a, b* extend ¼ inch out from the end of the cylinder, and have an outer diameter of ⅜ inch, although the dimensions may vary in other configurations.

Figure 10:
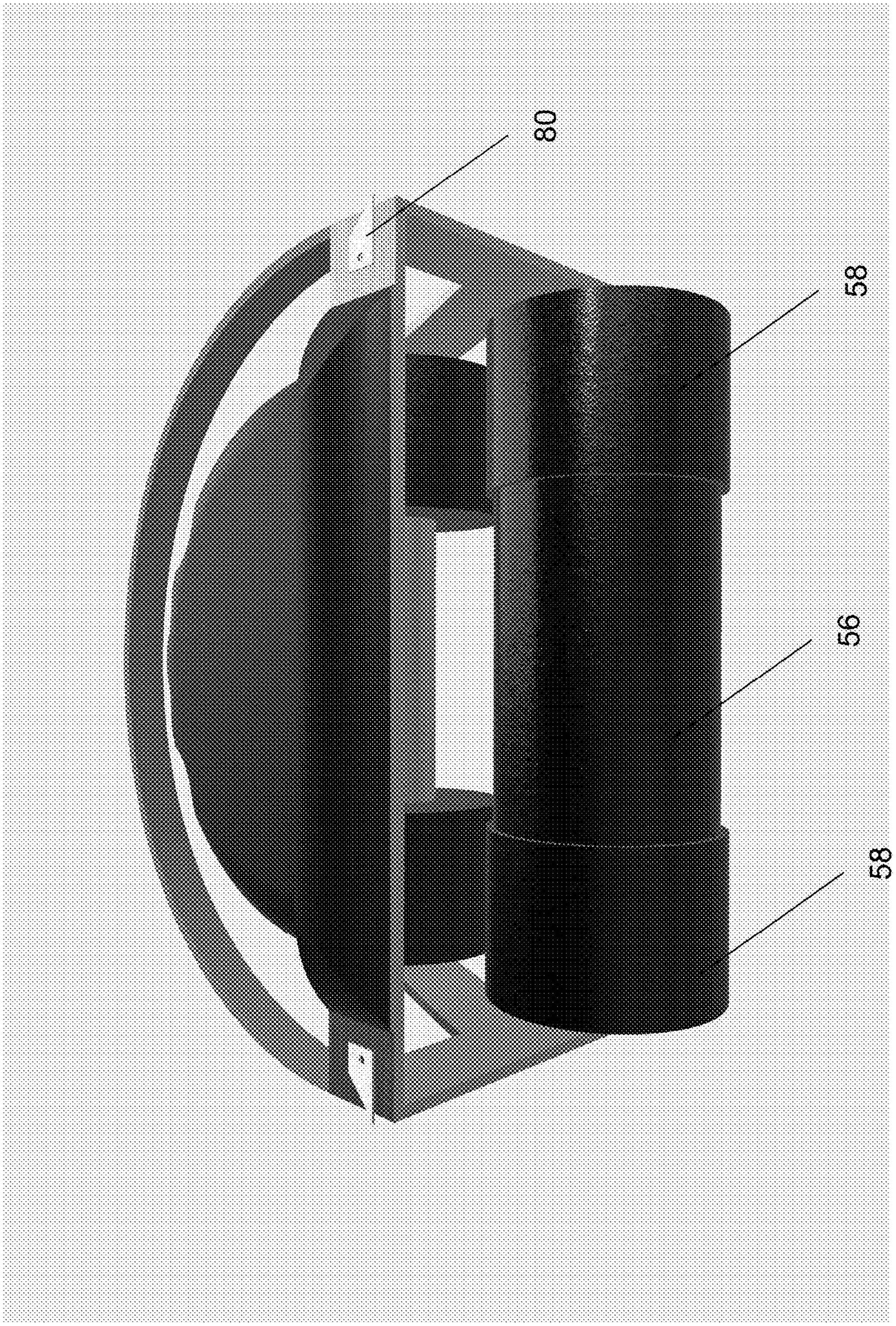
FIGS. 10 and 11 show perspective views of another configuration of the tool.
Figure 11:
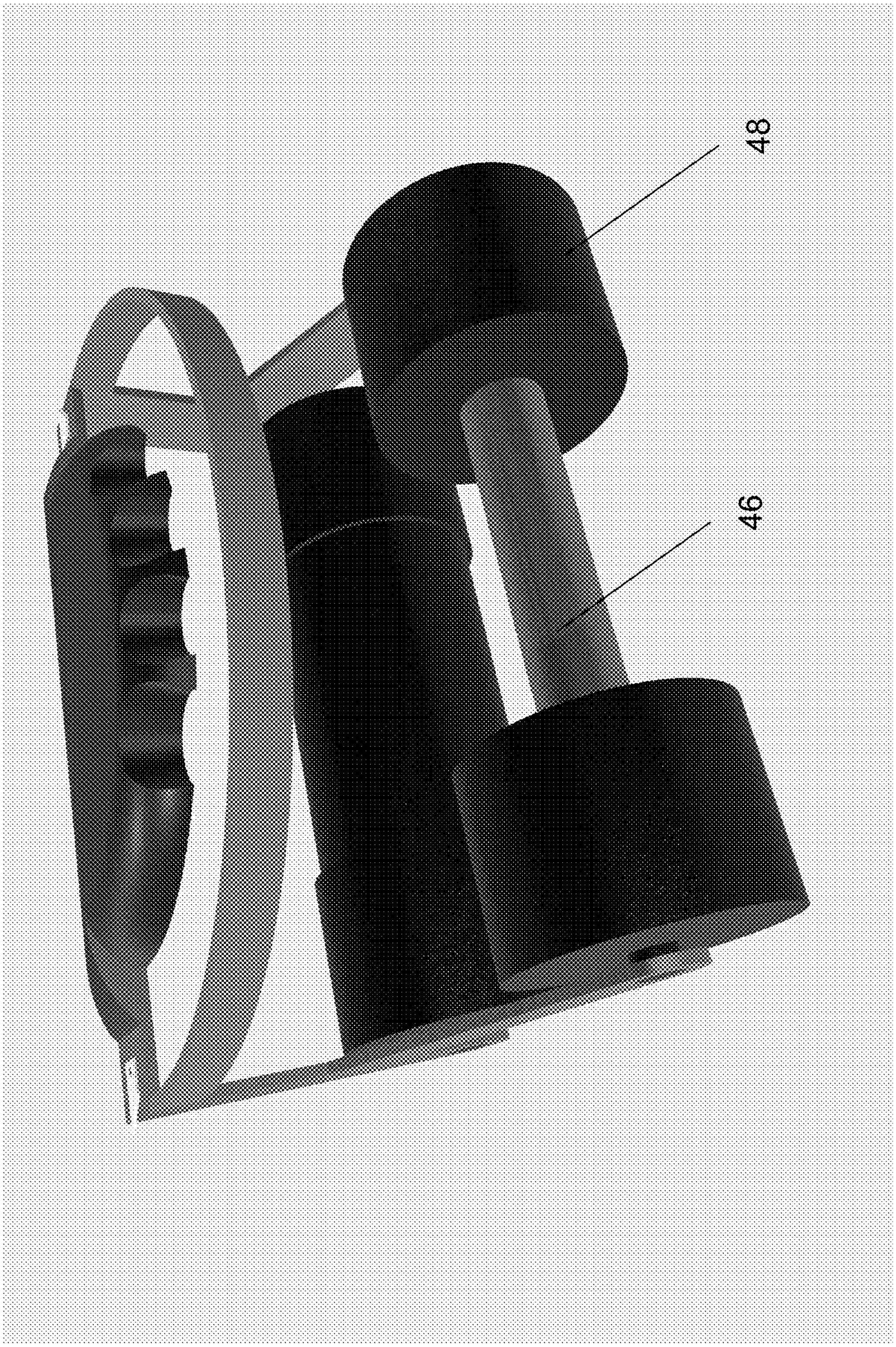

As seen in FIGS. 10 and 11, the outer diameter of the cylinder of the primary roller may vary for some portion along its length, such that the diameter at either end 58 of the cylinder is greater than the diameter in the middle or center 56 of the cylinder. As shown in the figures, the middle diameter is slightly less than the diameter at the ends (the diameter at each end is the same). This configuration allows the edges of the tape being rolled to receive more pressure, while the smaller diameter center helps to reduce tape puncture over the underlying seam.

The cylinder of the primary roller may be made of rubber (hard or soft), pure gum natural rubber, latex rubber, hard synthetic rubber, plastic, foam (soft or firm), or similar material. The core or axle may be metal or plastic, which prevents bending or warping of the primary roller. Preferably, the face of the cylinder is smooth, so as to reduce deformation or puncture of the tape. In a preferred embodiment, no indentations, indicia, or other markings are made on the tape.

The secondary roller 40 comprises a cylinder 42 with two sections 48 with the same outer diameter proximate the ends of the cylinder, with the center portion or section 46 having a smaller outer diameter. This configuration allows the secondary roller to act as a stable support for the user without touching the tape sections over the underlying seam, thereby reducing tape puncture and tears in that area. In the embodiment shown, the end sections have a diameter equal to the diameter of the ends (or the entirety) of the primary tape roller, thereby providing a stable support for the user, which can help prevent injuries from falls or the like, such as when the user is working in an elevated position (e.g., from a ladder), by allowing the user to maintain "three or multiple points of contact" while rolling the tape.

The edges of the tape being rolled also can receive more pressure from the outer faces of the end sections 48, helping to ensure proper adhesion along the edges of the tape. The outer faces of the end sections 48 are preferably smooth for the same reasons discussed above for the primary roller. Similarly, while the center section 46 is not intended to contact the tape, the center section also is preferably smooth in case it does.

The ends comprise holes or spaces 54*a, b* configured to receive the mounting posts 44*a, b* on the secondary roller support 22. The secondary roller thus is rotationally mounted on the secondary roller support. The secondary roller 40 may be removably mounted, and thus a secondary roller can be replaced with a roller of the same configuration, material and/or size, or a differing configuration, material and/or size.

The secondary roller may be made of rubber (hard or soft), pure gum natural rubber, latex rubber, hard synthetic rubber, plastic, foam (soft or firm), or similar material. The core or axle may extend through the center longitudinal axis, may be metal or plastic, which prevents bending or warping of the secondary roller as well as providing support between the two end sections 48.

Figure 8:
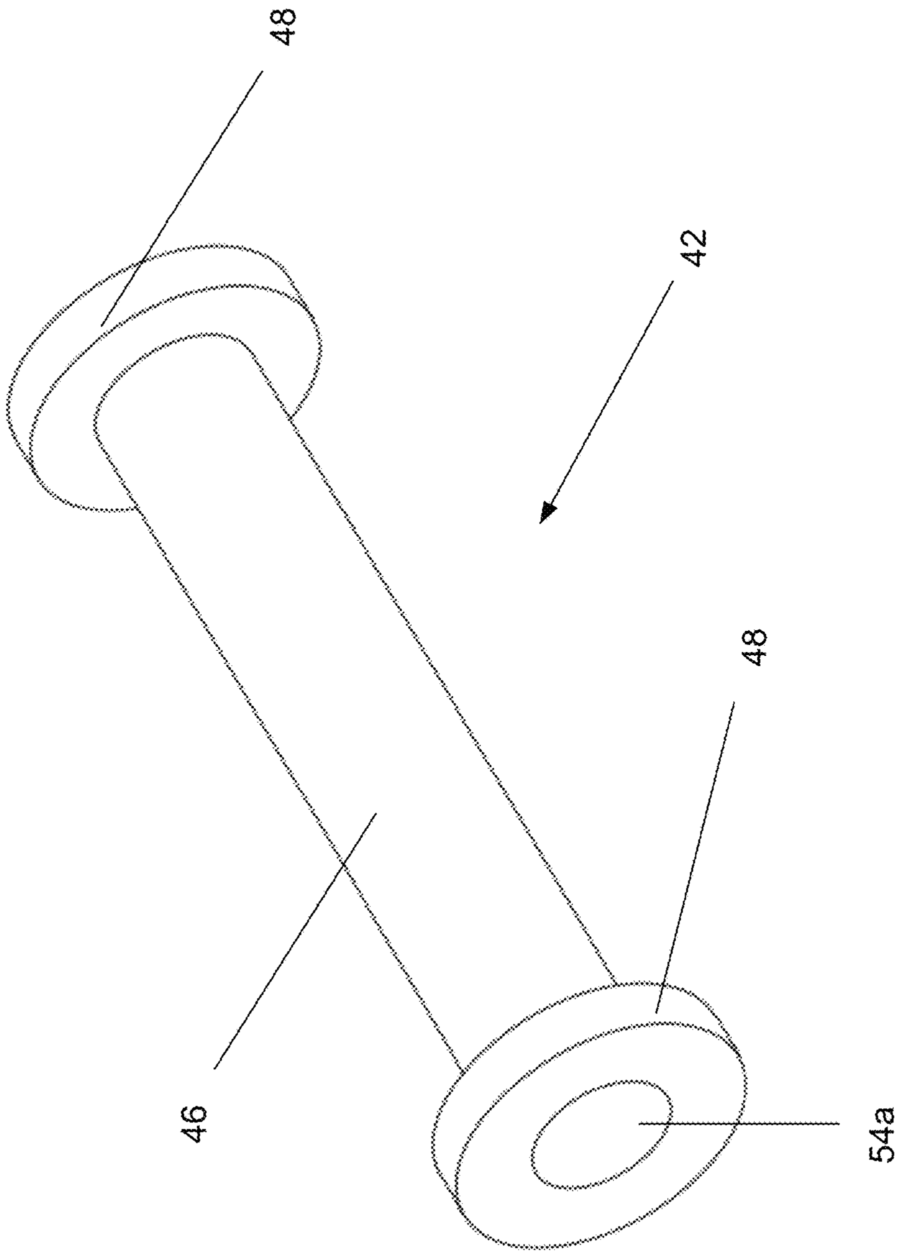
FIG. 8 shows a perspective view of the secondary roller.
Figure 9A:
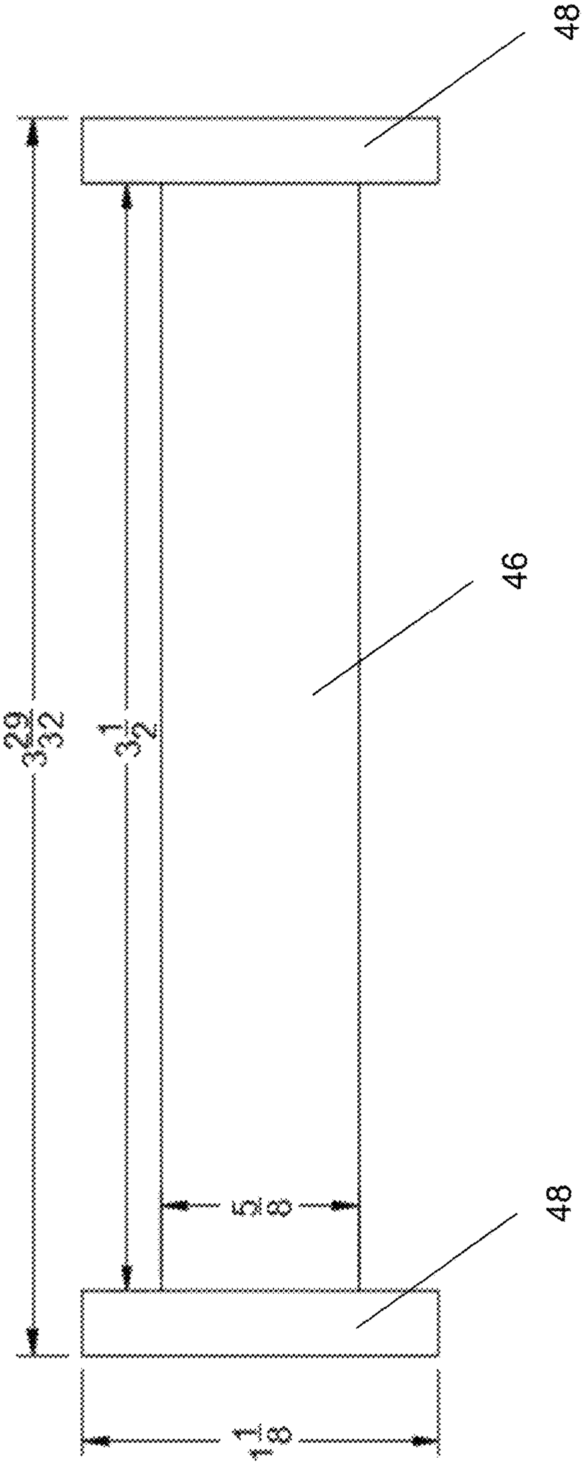
FIGS. 9A and 9B show front and end views of the secondary roller of FIG. 8.
Figure 9B:
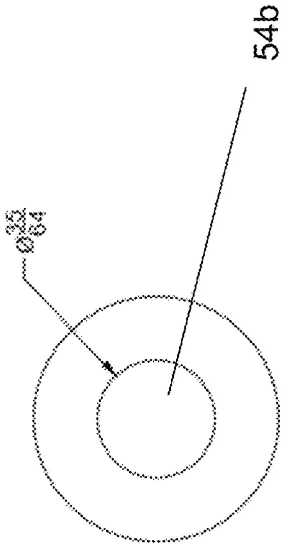

In the embodiment shown in FIGS. 8 and 9A-B, the secondary roller is a single, integrated piece, with the end sections 48 being relatively narrow compared to the total length of the roller. In the embodiment shown in FIGS. 9A and 9B, the outer diameter of the end sections is 1⅛ inch (i.e., the same outer diameter as the cylinder of the primary roller), and the outer diameter of the center section is ⅝ inch, although the dimensions may vary in other configurations.

In certain embodiments, as seen in FIGS. 10 and 11, the width of the end sections may be larger, with the cylindrical center section, which may be an axle or rod extending therebetween for strength and support. The two end-section rollers are spaced to contact only the outermost edges of the tape being rolled, and not any part of the tape directly over the underlying seam.

In the embodiment shown, the grip 14 extends forward in a semi-circle with slots, holes or indentations for placement of fingers and/or thumbs. Other shapes and forms of a grip may be used. In one embodiment, the grip may be sized for particular hand sizes, so that the tool can be designed for use by appropriate users with corresponding hand sizes. In another embodiment, the grip may be detachable, and thus replacement grips of various sizes may be installed on the same tool.

In the embodiment shown, the grip 14 may be used by either the user's right hand or left hand. In alternative embodiments, the grip may be configured to be preferentially right-handed or left-handed.

A retractable blade, knife, or blade tip 80 (made from ceramic, plastic, metal, or similar material) may be located at either or both ends of the upper support. The user may extend the blade and use it to cut seaming tape from the roll without removing his or her hand from the tool. In several embodiments the blade or blades are replaceable.

Figure 12:
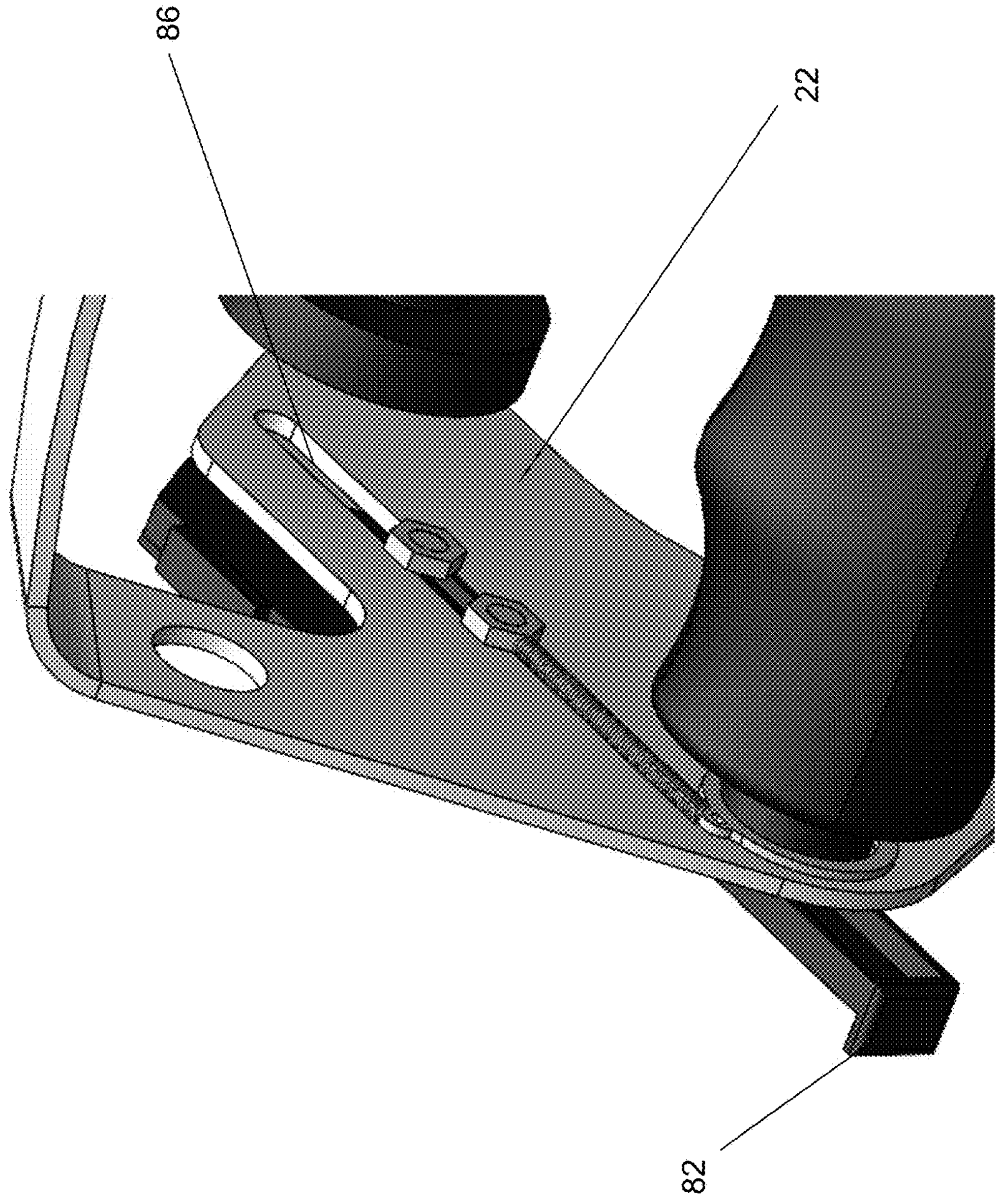
FIG. 12-14 show views of a spring-retractable blade or knife accessory on another configuration of the tool.
Figure 13:
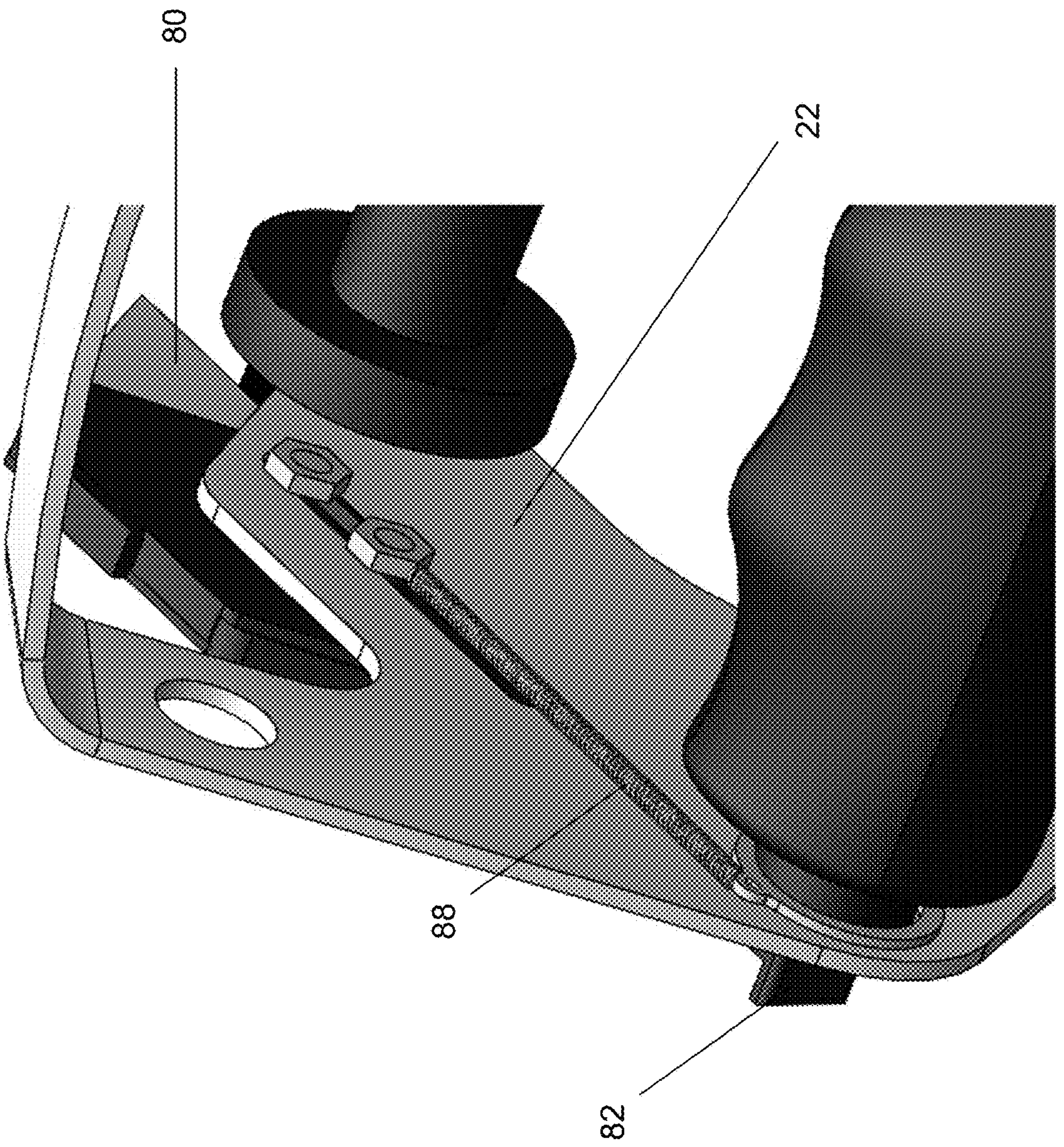
Figure 14:
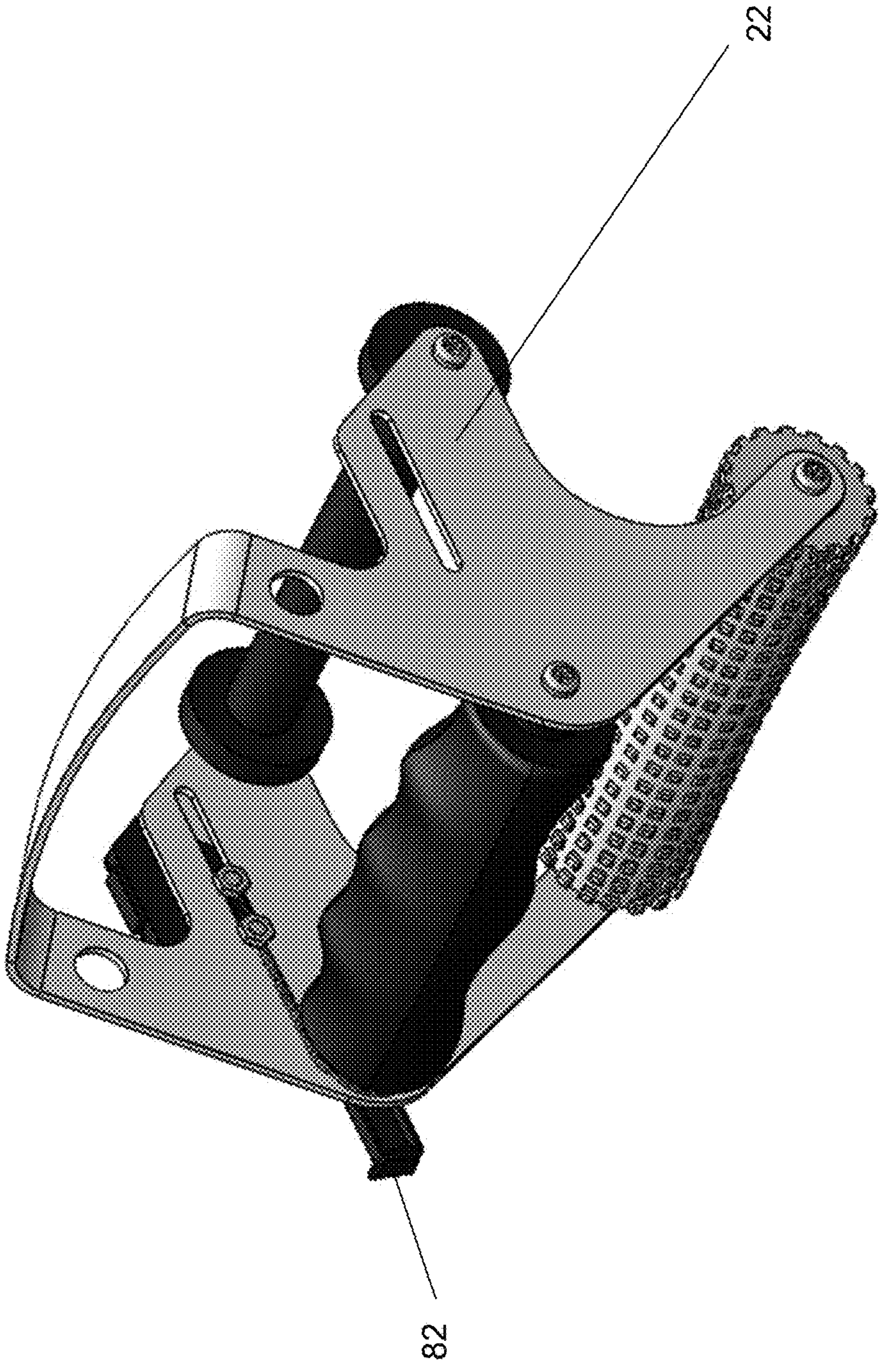

In a further embodiment, as seen in FIGS. 12-14, the blade or knife 80 may be located so as to be extendable when the user applies pressure (such as with the thumb) to the end 82 of the blade/knife holding mechanism, which causes the blade/knife 80 to extend beyond the end or edge of the corresponding support component, where it can be used for cutting tape or similar purposes. When placed on an appropriate roller support, such as the secondary roller support 22 as seen in the figures, this enables the user to use his or her thumb to extend the blade/knife along a slot 86 in the support while keeping a grip on the roller with his or her hand. A spring 88 applies bias to the mechanism when the blade/knife is extended, causing the blade/knife to retract to an unextended, retracted, home or base position on the corresponding support component, where the blade/knife is protected and not exposed, thereby preventing accidental cutting or injury. The blade/knife mechanism may be removed and/or replaced, such as by removing the nuts holding the bolts in the respective slots. This blade/knife arrangement may found on one or both of the supports, so that a blade/knife may be used by the right hand and the left hand.

One or more attachment points or holes 90 may be provided in the side or sides of the finger guard 12, or elsewhere in or on the frame. A security line or lines may be attached to the device 2 and secured to the user (e.g., to a belt or harness), to a ladder, or other anchor point, to prevent the device from falling from a height if the user's grip slips or the device is otherwise accidentally released. The user can then easily retrieve the device with descending from the ladder or other high point.

Figure 5:
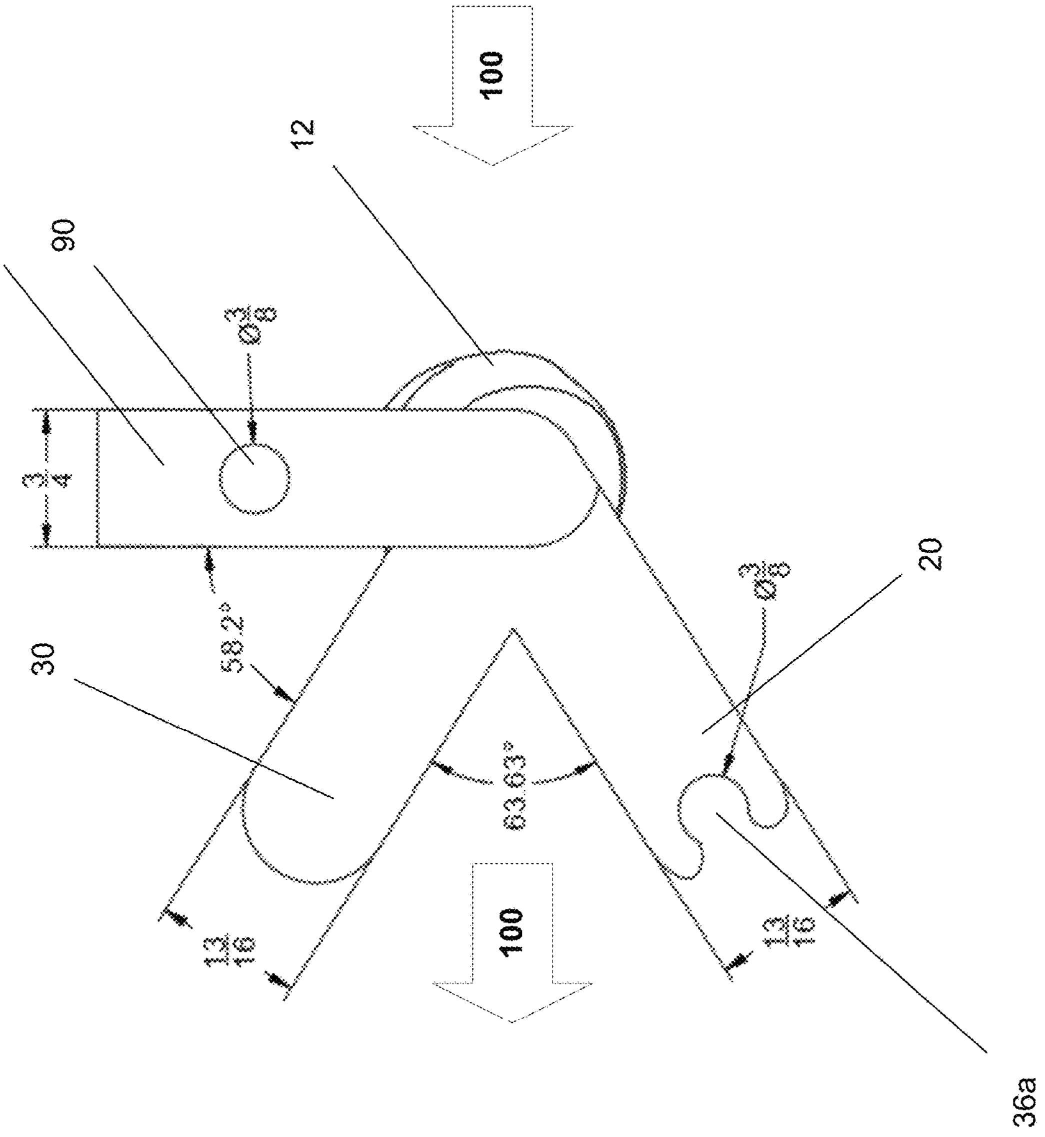
FIG. 5 shows a side view of FIG. 3.
Figure 6:
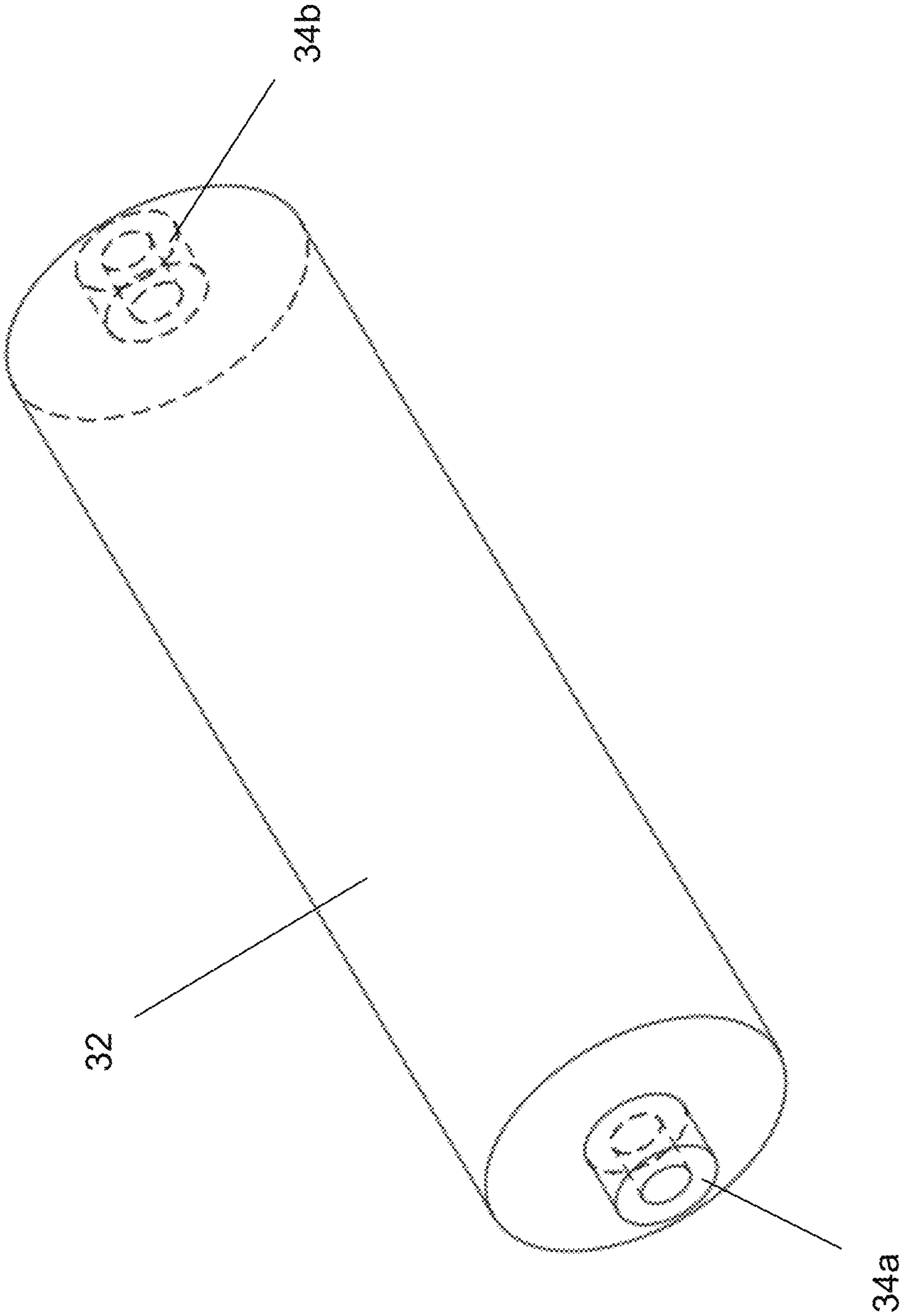
FIG. 6 shows a perspective view of the primary roller.
Figure 7A:
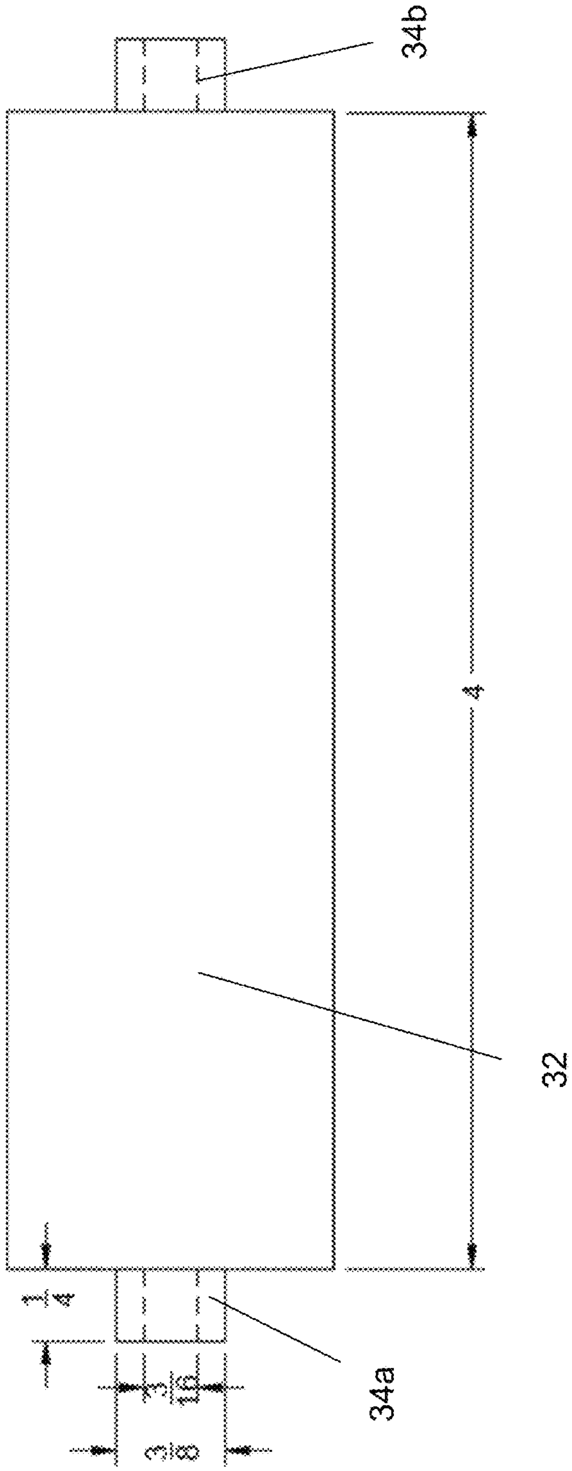
FIGS. 7A and 7B show front and end views of the primary roller of FIG. 6.
Figure 7B:
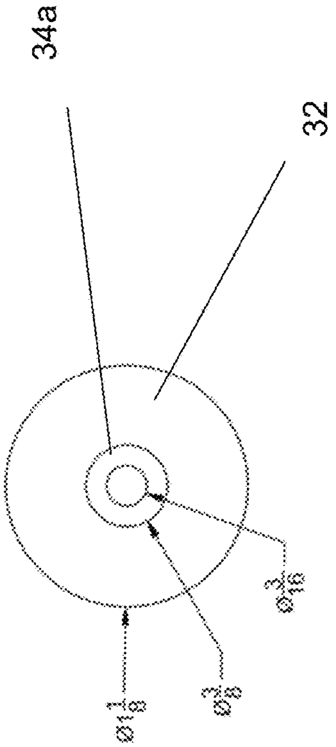

In use, the user applies the seaming tape to a section of seam between two or more panels, grasps the grip with one hand, and then passes the dual roller along the tape one or more times while applying pressure, with the center of the tape generally aligned with the center of the seaming tape. It should be noted that device of the present invention does not have a mount for the tape, and tape is not dispensed from a roll of tape on the device itself. The device can be rolled in either direction on the tape. The user thus is able to easily apply pressure with only one hand, with the multiple points of contact of (side to side, and front and back) providing even pressure and a stable base for the user, in sharp contrast to the instability inherent in using a rolling device with the roller or rollers at one end of a handle. In the present invention, the center of force 100 applied by the user during proper operation is between the primary roller and the secondary roller, not to the outside of either. As seen in FIG. 5, in one embodiment, the angle between the primary roller support and secondary roller support, which are integrated in the frame, is approximately 63.63 degrees, and the angle between the secondary roller support and the finger guard 14 is 58.2 degrees.

It should be noted that while the finger guard may be integrated with the frame and fixed in place (e.g., extending straight forward, generally parallel to the panel and tape surface), in some embodiments the finger guard may be rotatably attached to the upper support, and rotated and locked into a desired position. Likewise, a person of ordinary skill in the art would understand that the primary roller support and primary roller may swap locations with the secondary roller support and secondary roller.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A tape roller, comprising:

a frame with an upper support with a hand grip, a pair of primary roller support arms extending downward from the upper support, and a pair of secondary roller support arms extending downward from the upper support;

a primary roller rotationally mounted on the pair of primary roller support arms;

a secondary roller rotationally mounted on the pair of secondary roller support arms; and a knife or blade mounted on one of said secondary roller support arms or primary support arms;

wherein the primary roller has an axis of rotation and the hand grip has a length parallel to the axis of rotation of the primary roller.

2. The tape roller of claim 1, wherein the secondary roller comprises two end sections with a first outside diameter, and a center section with a second outside diameter, wherein the first outside diameter is greater than the second outside diameter.

3. The tape roller of claim 2, wherein the primary roller comprises a cylinder with a third outside diameter.

4. The tape roller of claim 3, wherein the third outside diameter is equal to the first outside diameter.

5. The tape roller of claim 1, further comprising a finger guard disposed proximate a side of the hand grip.

6. The tape roller of claim 1, wherein the hand grip is configured to be held by a single human hand.

7. The tape roller of claim 6, wherein the hand grip is configured to be held by either a right hand or a left hand.

8. The tape roller of claim 1, further comprising a safety line attachment point.

9. The tape roller of claim 1, wherein the primary roller is removably mounted on the pair of primary roller support arms.

10. The tape roller of claim 1, wherein the secondary roller is removably mounted on the pair of secondary roller support arms.

11. The tape roller of claim 1, wherein the hand grip is removably attached to the frame.

12. The tape roller of claim 1, wherein the pair of primary roller support arms and the pair of secondary roller support arms extend from proximate the hand grip.

13. The tape roller of claim 12, where the pair of primary roller support arms and the pair of secondary roller support arms form an angle therebetween.

14. The tape roller of claim 1, wherein a roll of tape is not mounted thereon or dispensed therefrom.

15. The tape roller of claim 1, wherein the primary roller comprises rubber.

16. The tape roller of claim 1, wherein the knife or blade is mounted on one of the secondary roller supports.

17. The tape roller of claim 1, wherein the knife or blade is a first knife or blade mounted to a first one of the secondary roller supports, and further comprising a second knife or blade mounted to a second one of the secondary roller supports.

18. A tape roller, comprising:

a frame with an upper support with a hand grip, a pair of primary roller support arms extending downward from the upper support, and a pair of secondary roller support arms extending downward from the upper support;

a primary roller rotationally mounted on the pair of primary roller support arms;

a secondary roller rotationally mounted on the pair of secondary roller support arms; and a knife or blade mounted on one of said secondary roller support arms or primary support arms;

wherein the knife or blade is extendable and retractable.

19. The tape roller of claim 18, wherein the knife or blade is attached to a holder with a pressing end, whereby the knife or blade is extended from a home position by application of pressure to the pressing end.

20. The tape roller of claim 19, further comprising a spring with two ends, one end attached to the holder, wherein the spring is configured to retract the knife or blade to the home position when the pressure is removed from the pressing end.

* * * * *